(12) United States Patent
Iida et al.

(10) Patent No.: US 11,494,167 B2
(45) Date of Patent: Nov. 8, 2022

(54) METHOD FOR IDENTIFYING PROJECT COMPONENT, AND REUSABILITY DETECTION SYSTEM THEREFOR

(71) Applicant: Hitachi Automotive Systems, Ltd., Hitachinaka (JP)

(72) Inventors: Takahiro Iida, Tokyo (JP); Telang Geet Tapan, Bangalore (IN); Satoshi Yashiro, Bangalore (IN); Takafumi Suzuki, Hitachinaka (JP); Masahiro Matsubara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 161 days.

(21) Appl. No.: 17/264,799

(22) PCT Filed: Jul. 2, 2019

(86) PCT No.: PCT/JP2019/026287
§ 371 (c)(1),
(2) Date: Jan. 30, 2021

(87) PCT Pub. No.: WO2020/026680
PCT Pub. Date: Feb. 6, 2020

(65) Prior Publication Data
US 2021/0294581 A1    Sep. 23, 2021

(30) Foreign Application Priority Data
Aug. 3, 2018 (IN) .............................. 201841029225

(51) Int. Cl.
*G06F 8/36* (2018.01)
*G06N 20/00* (2019.01)
(Continued)

(52) U.S. Cl.
CPC .............. *G06F 8/36* (2013.01); *G06F 40/247* (2020.01); *G06F 40/30* (2020.01); *G06N 20/00* (2019.01); *G06F 3/0482* (2013.01)

(58) Field of Classification Search
CPC .......... G06F 8/36; G06F 40/30; G06F 40/247; G06F 3/0482; G06N 20/00
See application file for complete search history.

(56) References Cited

U.S. PATENT DOCUMENTS 9,971,633 B1    5/2018  Barsness et al.
2003/0200532 A1 * 10/2003  Gensel ..................... G06F 8/71
                                                                    717/115
(Continued)

FOREIGN PATENT DOCUMENTS

| JP | 4-299735 A | 10/1992 |
| JP | 8-286901 A | 11/1996 |
| JP | 2016-177359 A | 10/2016 |

OTHER PUBLICATIONS

Yong Hu et al., "Software Project Risk Management Modeling with Neural Network and Support Vector Machine Approaches", [Online], pp. 1-5, [Retrieved from Internt on Aug. 26, 2022], <https://ieeexplore.ieee.org/stamp/stamp.jsp?arnumber=4344537> (Year: 2007).*

(Continued)

*Primary Examiner* — Ziaul A Chowdhury
(74) *Attorney, Agent, or Firm* — Crowell & Moring LLP (57) ABSTRACT

Disclosed subject matter is related to project reusability including method and system for identifying reusable project components for building a new project. The method comprises extracting current requirement of the new project from one or more data sources, using NLP and detect pre-existing requirements associated with pre-existing projects, similar to the current requirement by performing semantic analysis of the current requirement and the pre-existing requirements using a predefined machine learning (Continued)

technique such as Latent Semantic Analysis (LSA) technique. Further, a similarity score is determined for each of the one or more pre-existing requirements based on degree of similarity between the current requirement and the pre-existing requirements. Finally, the reusability detecting system retrieves project components associated with one of the pre-existing requirements based on the similarity score that are the reusable project components for building the new project, thereby reducing time, cost and resources required for developing the new project.

20 Claims, 7 Drawing Sheets

(51) Int. Cl.
  *G06F 40/30* (2020.01)
  *G06F 3/0482* (2013.01)
  *G06F 40/247* (2020.01)

(56) References Cited

U.S. PATENT DOCUMENTS

| | | | | | |
|---|---|---|---|---|---|
| 2009/0064106 | A1* | 3/2009 | Webster | | G06F 8/36 |
| | | | | | 717/120 |
| 2009/0259987 | A1* | 10/2009 | Bergman | | G06F 8/36 |
| | | | | | 717/107 |
| 2014/0052758 | A1* | 2/2014 | Callery | | G06Q 10/0631 |
| | | | | | 707/E17.014 |

OTHER PUBLICATIONS

Justin S. Di Stefano et al., "Machine Learning for Software Engineering: Case Studies in Software Reuse", [Online], pp. 1-6, [Retrieved from internet on Aug. 26, 2022], <https://ieeexplore.ieee.org/stamp/stamp.jsp?arnumber=1180811> (Year: 2002).*

Surbhi Maggo et al."A Machine Learning based Efficient Software Reusability Prediction Model for Java Based Object Oriented Software", [Online], pp. 1-13, [Retrieved from Internt on Aug. 26, 2022], <https://www.mecs-press.org/ijitcs/ijitcs-v6-n2/IJITCS-V6-N2-1.pdf>, (Year: 2014).*

Bayu Tenoyo et al., "Concept Representation and Its Role in Artifact Development", [Online], pp. 687-692, [Retrieved from Internet on Aug. 26, 2022], <https://ieeexplore.ieee.org/stamp/stamp.jsp?arnumber=7273465>, (Year: 2015).*

Pirapuraj, P. et al., "Analyzing Source Code Identifiers for Code Reuse using NLP Techniques and WordNet", 2017 Moratuwa Engineering Research Conference (MERCon), May 31, 2017, pp. 105-110 (six (6) pages).

Hindi-language Office Action issued in Indian Application No. 201841029225 dated Feb. 3, 2021 with English translation (eight (8) pages).

International Search Report (PCT/ISA/210) issued in PCT Application No. PCT/JP2019/026287 dated Sep. 3, 2019 with English translation (two (2) pages).

Japanese-language Written Opinion (PCT/ISA/237) issued in PCT Application No. PCT/JP2019/026287 dated Sep. 3, 2019 (three (3) pages).

* cited by examiner

METHOD FOR IDENTIFYING PROJECT COMPONENT, AND REUSABILITY DETECTION SYSTEM THEREFOR

The following specification particularly describes the invention and the manner in which it is to be performed.

TECHNICAL FIELD

The present subject matter is related, in general to project reusability and more particularly, but not exclusively to a method and system for identifying reusable project components for building a new project.

BACKGROUND

Generally, building a new project involves going through the entire Software Development Life Cycle (SDLC), when requirement for the new project is provided by a customer. This involves enormous amount of man power, time, money and resources. Following this method for every new project would not be feasible for an organization, as it would reduce productivity and efficiency of the organization and also increases cost.

In recent times, new projects are being designed by reusing existing project components that were used for previous projects. Reusing has been recognized to achieve better projects more quickly and at a lower cost. Therefore, design process based on project component reuse is widely adapted. However, the biggest problem to be addressed in the reusing concept would be how to determine which project components to be reused.

Some of the existing techniques provide a method where originally a software taxonomy is generated and software profiles in-line with the taxonomy may be consequently generated. The existing techniques provide a method where originally a software taxonomy is generated and software profiles in-line with the software taxonomy may be consequently generated. However, complexity level of this technique is high in view of generating the software taxonomy and creating a software profile based on the software taxonomy for comparison, which may not be user friendly. Also, this technique involves manual effort to generate the software taxonomy and the software profile that makes the technique time consuming. Few other techniques analyze existing dependencies in existing software components and match it with a new software to identify reusable components. However, this technique deals with first identifying dependencies between components by generating intermediary components such as surrogates, thereby increasing complexity of the process.

Therefore, though reusing project components is highly beneficial, the existing techniques fail to provide an efficient and user-friendly techniques to determine reusable project components.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a method for identifying reusable project components for building a new project. The method comprises extracting, by a reusability detecting system, current requirement of the new project from one or more data sources, using Natural Language Processing (NLP). Further, the reusability detecting system detects one or more pre-existing requirements associated with pre-existing projects, similar to the current requirement by performing semantic analysis of the current requirement and the one or more pre-existing requirements. Furthermore, the reusability detecting system determines a similarity score for each of the one or more pre-existing requirements based on degree of similarity between the current requirement and the one or more pre-existing requirements. Finally, the reusability detecting system retrieves project components associated with one of the one or more pre-existing requirements based on the similarity score. The retrieved project components are the reusable project components for building the new project.

Furthermore, the present disclosure includes a reusability detecting system for identifying reusable project components for building a new project. The reusability detecting system comprises a processor and a memory communicatively coupled to the processor. The memory stores processor-executable instructions, which, on execution, causes the processor to extract current requirement of the new project from one or more data sources, using Natural Language Processing (NLP). Further, the processor detects one or more pre-existing requirements associated with pre-existing projects, similar to the current requirement by performing semantic analysis of the current requirement and the one or more pre-existing requirements.

Furthermore, the processor determines a similarity score for each of the one or more pre-existing requirements based on degree of similarity between the current requirement and the one or more pre-existing requirements. Finally, the processor retrieves project components associated with one of the one or more pre-existing requirements based on the similarity score. The retrieved project components are the reusable project components for building the new project.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and system for identifying reusable project components for building a new project. A reusability detecting system may extract current requirement of the new project from one or more data sources, using Natural Language Processing (NLP). The one or more data sources may include, but not limited to, a repository, a customer and a Subject Matter Expert (SME). Upon extracting the current requirement of the new project, the reusability detecting system may perform semantic analysis of the current requirement with one or more pre-existing requirements associated with pre-existing projects. In some embodiments, the phrase "one or more pre-existing requirements" and the word "pre-existing requirement/s" may be alternatively used in the disclosure. In some embodiments, the semantic analysis may be performed using a predefined machine learning technique. As an example, the predefined machine learning technique may be a Latent Semantic Analysis (LSA) technique. Based on the semantic analysis, the reusability detection system may detect the one or more pre-existing requirements similar to the current requirement. Further, the reusability detecting system may quantify the similarity by determining a similarity score for each of the one or more pre-existing requirements based on degree of the similarity. Further, in some embodiments, the reusability detecting system may retrieve project components associated with one of the one or more pre-existing requirements based on the similarity score, which is referred as the reusable project component for the new project.

In some embodiments, when more than one pre-existing requirement may bear the identical similarity score, the reusability detecting system may prioritize the pre-existing requirements. In some other embodiments, user may select a pre-existing requirement of his choice. Further, in some embodiments, along with the pre-existing requirements that are similar to the current requirement, the reusability detecting system may also display one or more pre-existing requirements having a similar basic design as the pre-existing requirement, which is detected to be similar to the current requirement.

The present disclosure provides a feature wherein the project modules of the pre-existing projects may be reused for building new projects that are similar to a certain extent. Reusing ability reduces enormous time, cost and resources that would be involved in rebuilding a new project module from the beginning. Use of NLP eliminates the process of converting the customer requirements into machine understandable profiles using a predefined template and taxonomy. Therefore, the present disclosure eliminates substantial number of procedures involved in detecting reusability, thereby reducing the complexity and creating a user friendly environment. The present disclosure helps in increasing productivity by subsiding inefficient methods of developing project modules that require manual intervention.

Figure 1A:
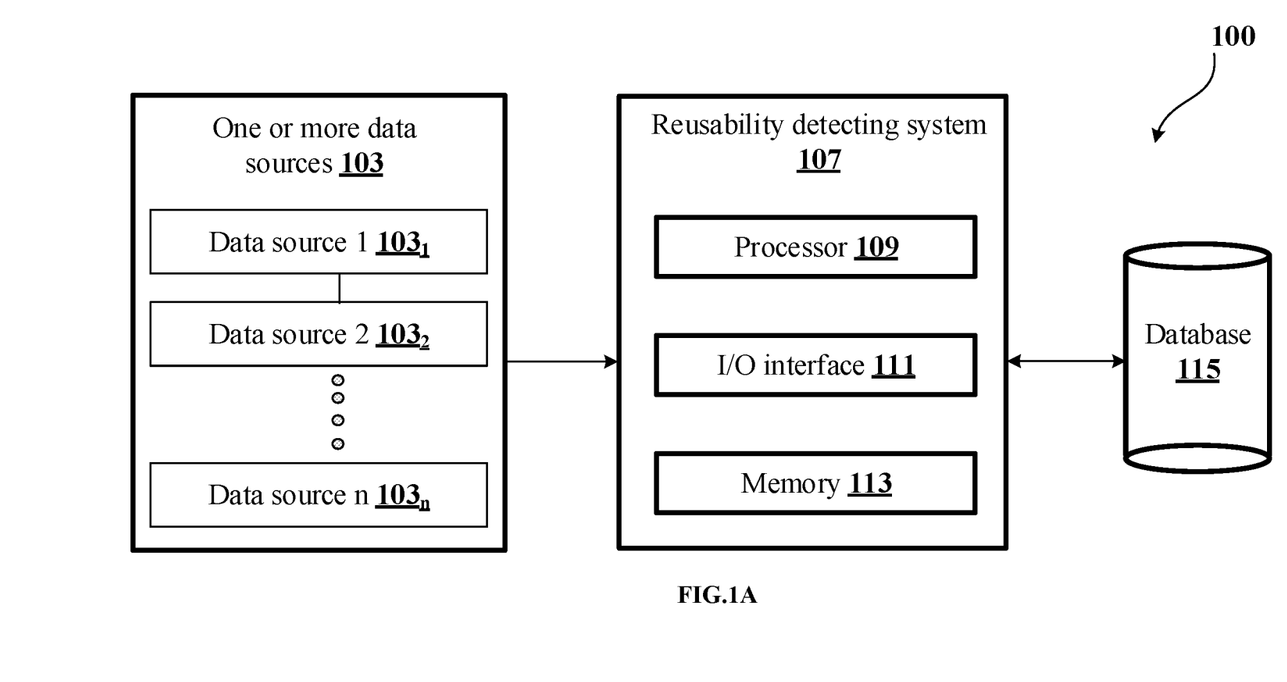
FIG. 1A shows an exemplary architecture for identifying reusable project components for building a new project in accordance with some embodiments of the present disclosure.

FIG. 1A shows an exemplary architecture for identifying reusable project components for building a new project in accordance with some embodiments of the present disclosure.

The architecture 100 comprises one or more data sources, data source 1 $103_1$ to data source n $103_n$ (collectively referred to as one or more data sources 103), a reusability detecting system 107 and a database 115. The one or more data sources 103 may include, but not limited to, a customer and a Subject Matter Expert (SME). In some embodiments, the one or more data sources 103 may be associated with the reusability detecting system 107 using a communication network (not shown in the FIG. 1A). As an example, the communication network may be a wired communication network, a wireless communication network or a combination of both wired and wireless communication network. In some embodiments, the database 115 may be associated with the reusability detecting system 107 as shown in the FIG. 1A. In some other embodiments, the database 115 may be integrated within the reusability detecting system 107. The database 115 may include, but not limited to, one or more pre-existing requirements associated with pre-existing projects, project modules corresponding to each of the one or more pre-existing requirements and a reuse history (explained in detail at a later section) associated with each of the one or more pre-existing requirements In some embodiments, the phrase "one or more pre-existing requirements" and the word "pre-existing requirement/s" may be alternatively used in the disclosure.

Figure 1B:
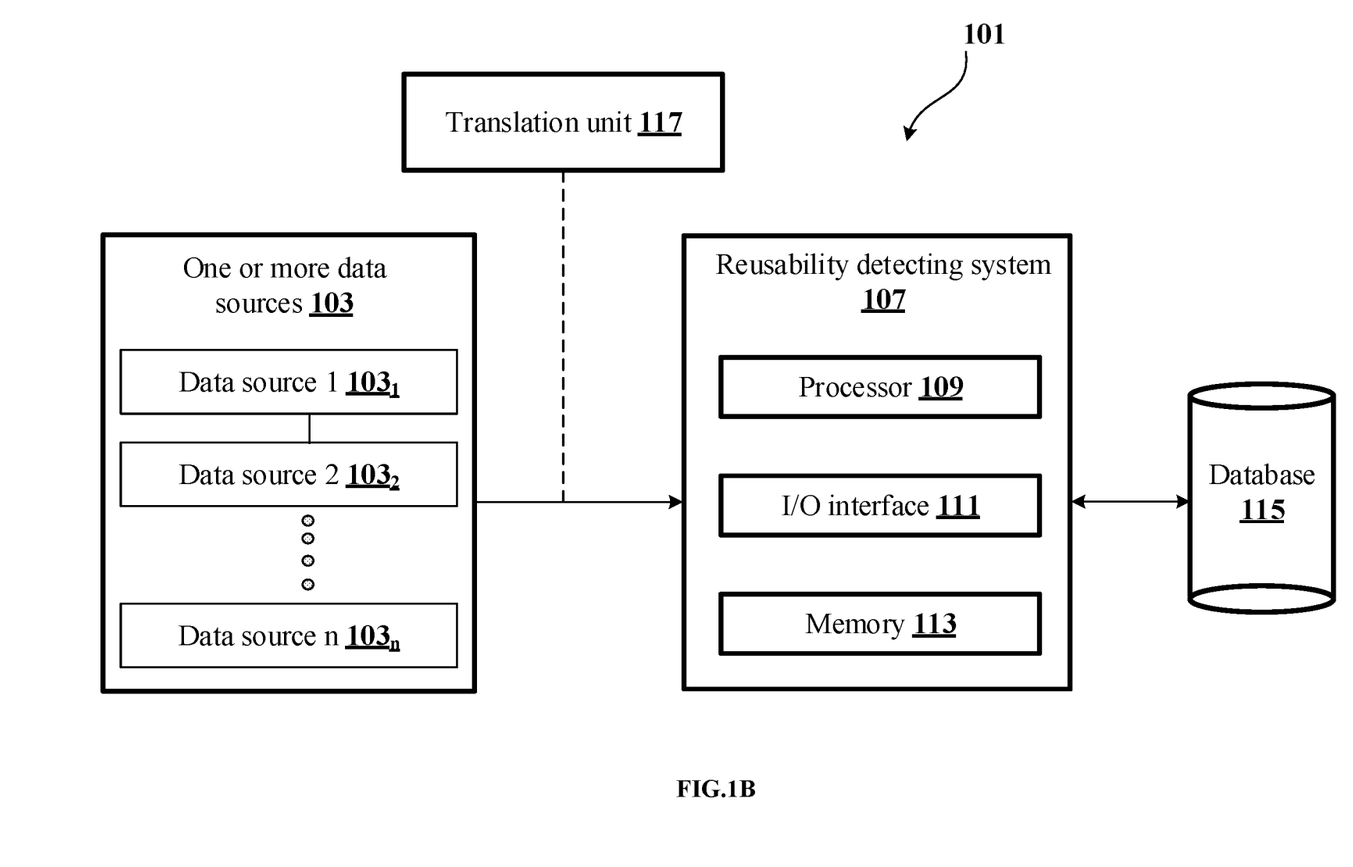
FIG. 1B shows an exemplary architecture for identifying reusable project components for building a new project in accordance with an alternate embodiment of the present disclosure.

The reusability detecting system 107 comprises a processor 109, an Input/output (I/O) interface 111 and a memory 113. In an embodiment, the processor 109 may receive information related to current requirement of a new project from the one or more data sources 103. As an example, the information related to the current requirement may include an Identifier, a serial number, statements, remarks and the like which is the entire information. The processor 109 may extract the current requirements of the new project using the Natural Language Processing (NLP) from the entire information. In an alternate embodiment, the processor 109 may be associated with a translation unit as shown in the FIG. 1B. When the information related to the current requirement is in a language other than English, the translation unit 117 may translate the information related to the current requirement into English and provide the translated information to the processor 109. Further, the processor 109 may perform semantic analysis of the current requirement with the one or more pre-existing requirements associated with pre-existing projects to detect the one or more pre-existing requirements similar to the current requirement. In some embodiments, the semantic analysis may be performed using a predefined machine learning technique. As an example, the predefined machine learning technique may be a Latent Semantic Analysis (LSA) technique. In some embodiments, the processor 109 may determine a similarity score for each of the one or more pre-existing requirements based on degree of the similarity of the current requirement and the one or more pre-existing requirements. Further, in some embodiments, the processor 109 may retrieve project components associated with one of the one or more pre-existing requirements based on the similarity score, which are referred as the reusable project components for the new project.

In some embodiments, more than one pre-existing requirement may bear the identical similarity score. In such scenarios, the processor 109 may prioritize the pre-existing requirements bearing the identical similarity score based on the reuse history associated with the pre-existing requirements. In some embodiments, the reuse history may include, but not limited to, a predefined weightage associated with the pre-existing requirement and a reasoning of selection of the pre-existing requirement for building pre-existing projects. In some embodiments, the processor 109 may select the pre-existing requirement with highest priority for reusing. In some other embodiments, user may select a pre-existing requirement of his choice. Further, in some embodiments, along with the pre-existing requirements that are similar to the current requirement, the processor 109 may display one or more pre-existing requirements having a similar basic design as the pre-existing requirement, which is detected to be similar to the current requirement.

Figure 2A:
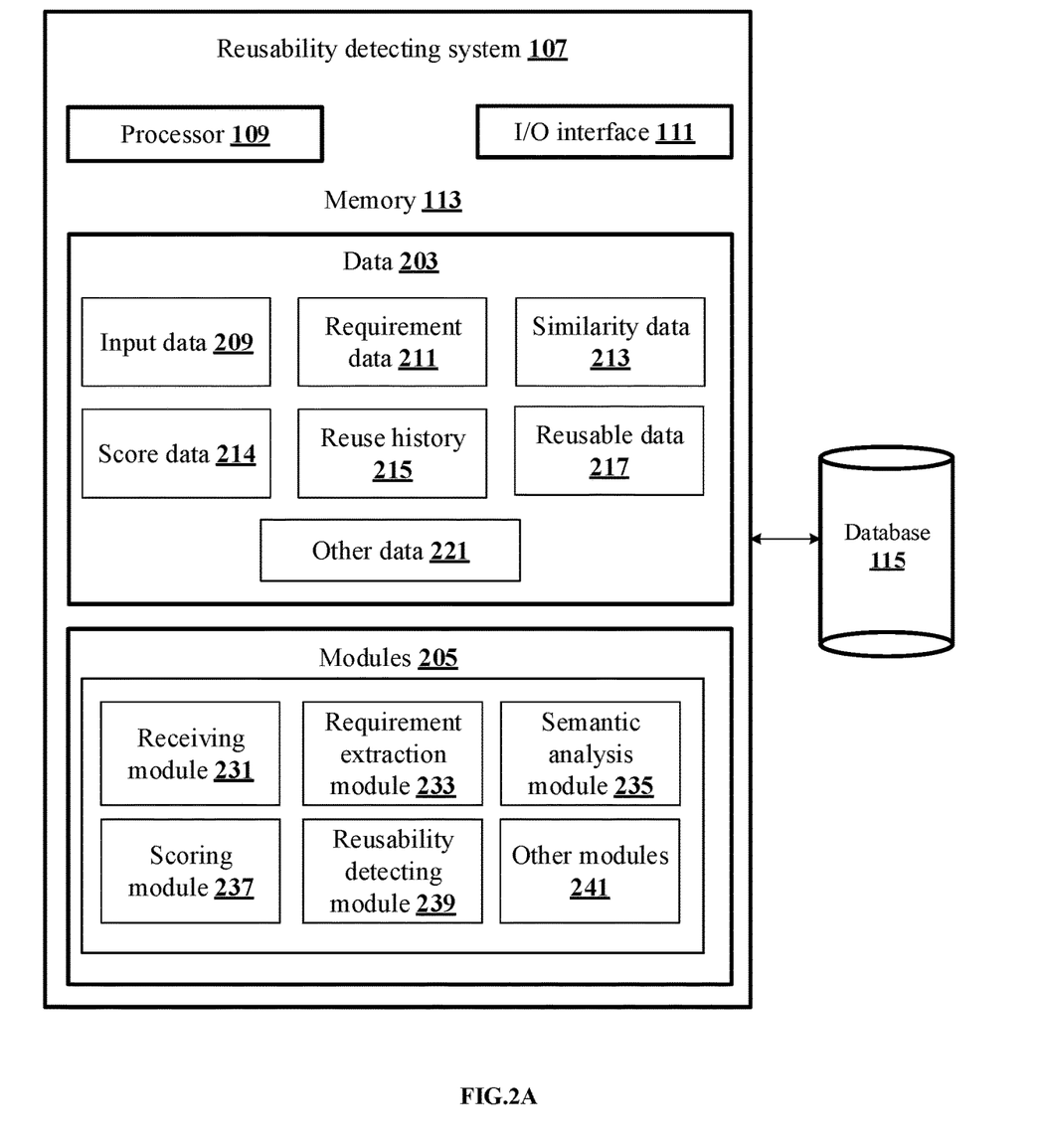
FIG. 2A shows a detailed block diagram of a reusability detecting system for identifying reusable project components for building a new project in accordance with some embodiments of the present disclosure.

FIG. 2A shows a detailed block diagram of a reusability detecting system for identifying reusable project components for building a new project in accordance with some embodiments of the present disclosure.

In some implementations, the reusability detecting system 107 may include data 203 and modules 205. As an example, the data 203 is stored in the memory 113 configured in the reusability detecting system 107 as shown in the FIG. 2A. In one embodiment, the data 203 may include input data 209, requirement data 211, similarity data 213, score data 214, reuse history 215, reusable data 217 and other data 221. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 221 may store data, including temporary data and temporary files, generated by the modules 205 for performing the various functions of the reusability detecting system 107.

In some embodiments, the data 203 stored in the memory 113 may be processed by the modules 205 of the reusability detecting system 107. The modules 205 may be stored within the memory 113. In an example, the modules 205 communicatively coupled to the processor 109 configured in the reusability detecting system 107, may also be present outside the memory 113 as shown in FIG. 2A and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a receiving module 231, a requirement extracting module 233, a semantic analysis module 235, scoring module 237, reusability detecting module 239 and other modules 241. The other modules 241 may be used to perform various miscellaneous functionalities of the reusability detecting system 107. It will be appreciated that such aforementioned modules 205 may be represented as a single module or a combination of different modules.

In some embodiments, the receiving module 231 may receive information related to current requirement of a new project from one or more data sources 103. As an example, the one or more data sources 103 may include, but not limited to, a customer and a Subject Matter Expert (SME). In some embodiments, the information received from the customer may be raw data written in natural language, which may not necessarily include domain specific information. On the other hand, the information received from the SME may be a technical specification i.e. the information includes domain knowledge incorporated by the SME such as software designer. In some embodiments, the receiving module 231 may receive the information related to the current requirement from both, customer and the SME for every new project. Further, as an example, the information related to the current requirement may include an Identifier, a serial number, statements, remarks and the like. The information related to the current requirement may be stored as the input data 209. In some embodiments, when the information related to the current requirement is in a language other than English, a translation unit 117 associated with the reusability detecting system 107 may translate the information related to the current requirement into English and provide the translated information to the processor 109. Therefore, the receiving module 231 may receive translated version of the information related to the current requirement.

In some embodiments, the requirement extracting module 233 may extract the current requirement of the new project using Natural Language Processing (NLP) from the entire information related to the current requirement. Therefore, as part of the NLP technique, the requirement extracting module 233 may initially gather the input data 209. Further, the requirement extracting module 233 may apply a predefined pattern on the input data 209. As an example, the predefined pattern may be "Extract statement". In such scenarios, the requirement extracting module 233 may select only the information present under the heading "statement" from the input data 209. Further, the requirement extracting module 233 may extract the selected information from the input data 209, which includes the current requirement of the new project. The requirement extracting module 233 may discard rest of the input data 209 upon extracting the current requirement. The current requirement may be stored as the requirement data 211.

As an example, consider exemplary input data received from the one or more data sources 103 as shown in the below Table 1.

TABLE 1

| ID | Layer | Name | Statement | Remarks |
|---|---|---|---|---|
| SRS_Fls_12132 | OR | Req001 | Flash driver shall be statically configurable | R01 |
| SRS_Fls_12133 | OR | Req002 | Flash memory properties shall be published | R03 |
|  | OR | Req003 | The flash driver shall provide an asynchronous read function | R05 |

Consider the requirement extracting module 233 applied a pattern "Extract statement" for extracting the current requirement. The requirement extracting module 233 may then select only the column having the heading "Statement" from the above Table 1. Therefore, the data extracted from the exemplary input data i.e. exemplary current requirement of an exemplary new project may be as shown below:

Flash driver shall be statically configurable
Flash memory properties shall be published
The flash driver shall provide an asynchronous read function In some embodiments, the requirement extracting module 233 may also extract the one or more pre-existing requirements of pre-existing projects from a database 115 associated with the reusability detecting system 107.

Further, in some embodiments, the semantic analysis module 235 may perform semantic analysis of the current requirement with the one or more pre-existing requirements associated with pre-existing projects. In some embodiments, the semantic analysis may be performed using multiple predefined machine learning techniques. As an example, the predefined machine learning techniques may be Term Frequency-Inverse Document Frequency (TF-IDF) technique, a Latent Semantic Analysis (LSA) technique and the like. However, these predefined machine learning techniques should not be construed as a limitation of the present disclosure. The present disclosure is capable of applying any other semantic analysis techniques known in the art. In some embodiments, the process of semantic analysis may be mainly performed to compare words of the current requirement with words of each of the one or more pre-existing requirements. In some scenarios, the words may be different, however, the meaning conveyed by the words may be same or similar. Such words may be registered as synonyms by the processor 109. Initially, the semantic analysis module 235 may iteratively consider one current requirement and one pre-existing requirement, and segment words in the current requirement and the pre-existing requirement to topics. Further, the semantic analysis module 235 may convert the topics into numerical values using a process known as vectorization.

Figure 2B:
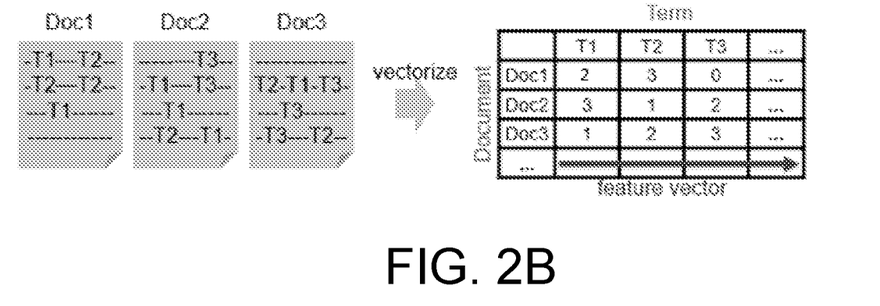
FIGS. 2B-2D show exemplary illustrations of vectorization process in accordance with some embodiments of the present disclosure.
Figure 2C:
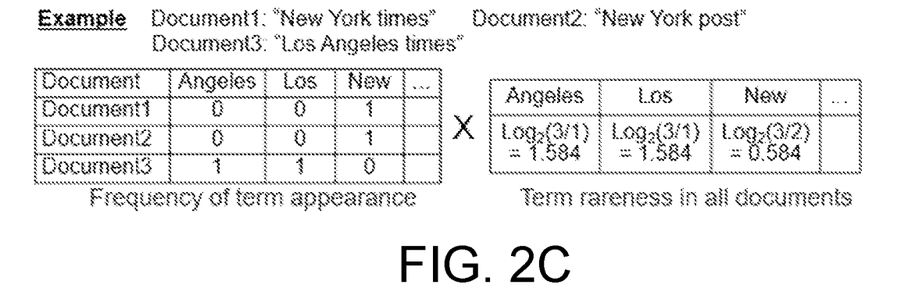

In some embodiments, consider vectorization is performed using the TF-IDF technique. In the TF-IDF technique, vectorization is performed based on frequency of term appearance and rareness of appeared term in a document. FIG. 2B illustrates an exemplary process of vectorization using the TF-IDF technique. As shown in the FIG. 2B, consider T1, T2 and T3 are 3 terms whose appearance is checked in documents (doc) 1, 2 and 3. The appearance of the terms may be further tabulated in a matrix format (also referred as term frequency matrix) as shown in the FIG. 2B. Further, in another example, consider document 1 comprises a sentence "New York Times", document 2 comprises a sentence "New York Post" and document 3 comprises a sentence "Los Angeles times". Consider the terms being searched are "New", "Los", "Angeles" and the like from the documents 1, 2 and 3. The frequency of appearance of the terms are represented in a tabular format with respect to the documents 1, 2 and 3 as shown in the FIG. 2C. Similarly, rareness of appearance of each of the abovementioned terms in each document is determined using a log technique as shown in the tabular format in FIG. 2C. Further, a product of the two tables shown in FIG. 2C i.e. product of the frequency of term appearance and rareness of appeared term in a document provides a vector (numerical value) for each term, that could be represented graphically.

Figure 2D:
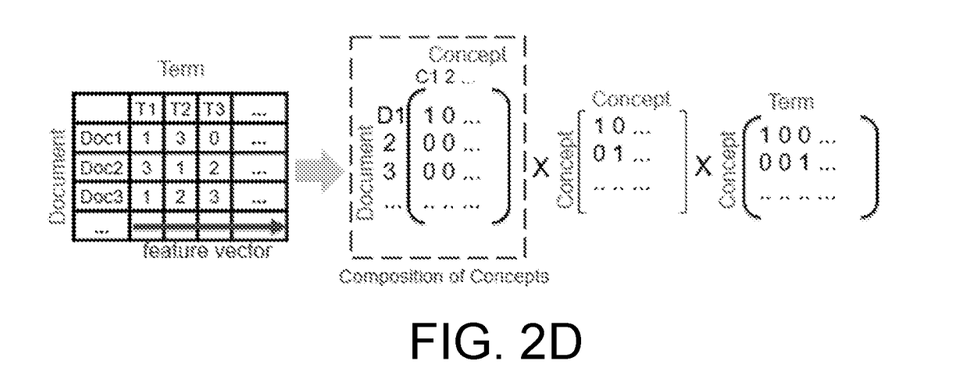

In some other embodiments, consider vectorization is performed using the LSA technique. In the LSA technique, vectorization is performed based on hidden concepts that may be extracted from the term frequency matrix. As illustrated in the FIG. 2D, initially the term frequency matrix is generated using the TF-IDF technique as explained above. Further, the LSA technique includes automatically deriving concepts from the term frequency matrix. In some embodiments, the concepts may be collection of dominant words and phrases (bag-of-words) in a specific pattern in each document. Upon deriving the concepts, the LSA technique includes plotting matrices for the following pairs: document and concept, concept and concept, and concept and term as shown in the FIG. 2D. In some embodiments, the documents may be classified based on how many concepts are present and which concepts are present in the document. It is to be noted that, transformation of the terms into matrices as shown in the FIG. 2D is mathematically correct, but what the concepts stand for may be abstract or indefinite.

Further, the semantic analysis module 235 may plot the numerical values (in other words vectors obtained using the above-mentioned techniques) corresponding to each topic on a graph. An exemplary graph may be as shown in the FIG. 2E. In the FIG. 2E, D1, D2, D3 and D4 may be vectors of different topics that are numerically represented on the graph. Further, the semantic analysis module 235 may measure at least one of:

Distance between the vectors
Angle between the vectors

Figure 2E:
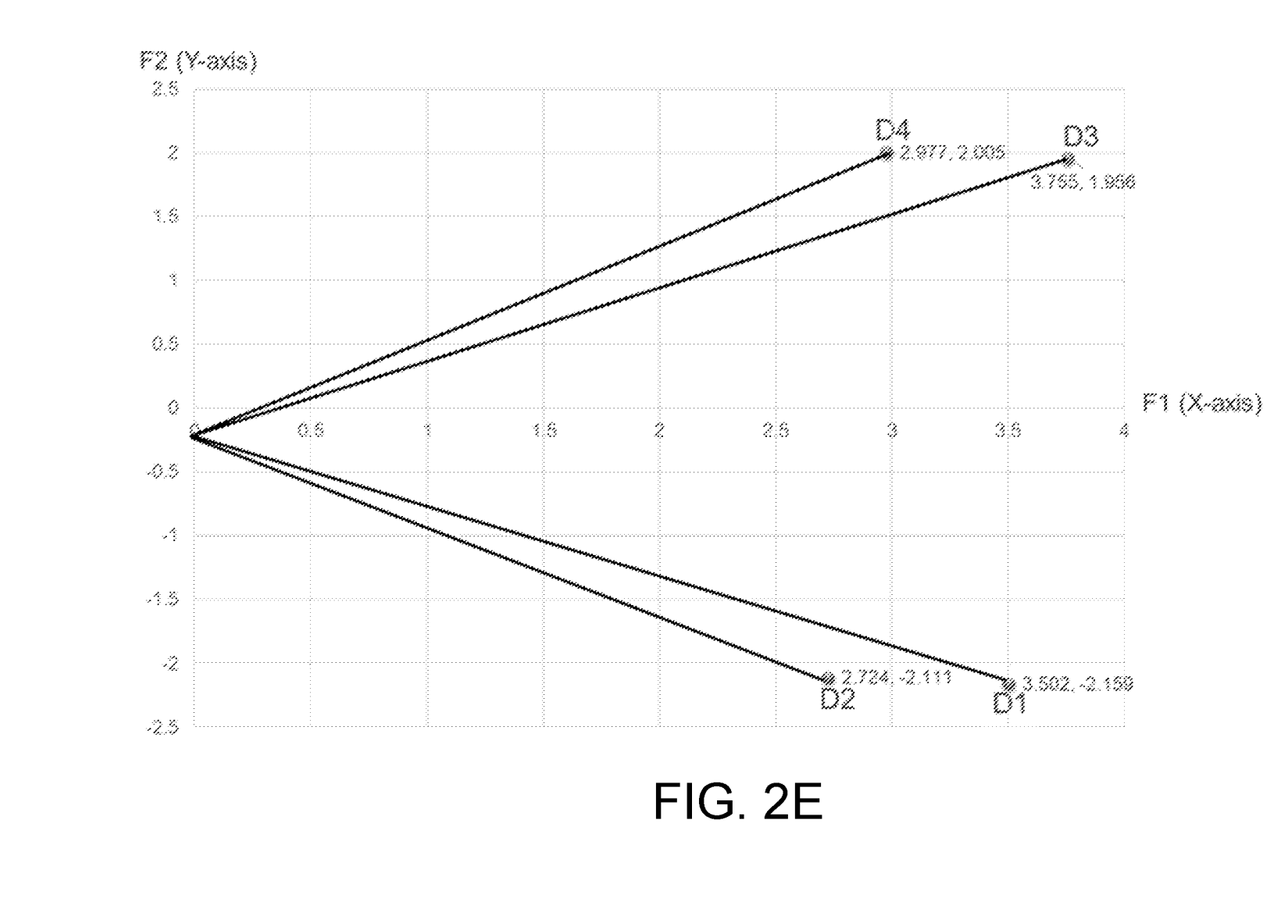
FIG. 2E shows an exemplary graph to indicate semantic analysis in accordance with some embodiments of the present disclosure.

In some embodiments, if the distance between the vectors is less, the corresponding requirements may be considered as similar. Alternatively, if the angle between the vectors is small, then requirements corresponding to these vectors are considered to be similar.

As an example, in the FIG. 2E, angle between D3 and D4 is small. Therefore, requirements illustrated by D3 and D4 may be semantically similar i.e. D3 and D4 may be considered to possess similar qualities or semantics. On the other hand, distance between D1 and D4 is large. Therefore, requirements corresponding to D1 and D4 may not be semantically similar i.e. D3 and D4 may not be considered to possess similar qualities or semantics.

Therefore, based on result of the semantic analysis module 235, the processor 109 may detect a similarity between the current requirement and the one or more pre-existing requirements. Results of the semantic analysis module 235 i.e. detected similarity, may be stored as the similarity data 213.

In some embodiments, the processor 109 may continuously self-learn the synonyms related to the one or more words of the current requirement and the one or more pre-existing requirements based on results of the semantic analysis module 235 i.e. based on the similarity data 213.

Further, in some embodiments, the scoring module 237 may generate a similarity score for each of the one or more pre-existing requirements based on the similarity data 213 generated by the semantic analysis module 235. In some embodiments, the similarity score may define degree of similarity between the current requirement and the one or more pre-existing requirements. The similarity score may be stored as score data 214.

Based on the similarity score, the reusability detecting module 239 may select one of the one or more pre-existing requirements that could be reused for building the new project. In some embodiments, the reusability detecting module 239 may determine a highest similarity score among the similarity scores of each of the one or more pre-existing requirements. One of the one or more pre-existing requirements bearing the determined highest similarity score may be considered as a closest match to the current requirement of the new project. Therefore, the reusability detecting module 239 may select the pre-existing requirement bearing the highest similarity score for reuse. In some other embodiments, the reusability detecting module 239 may determine the similarity scores exceeding a predefined similarity score. In some embodiments, the predefined similarity score may be a threshold value set for selecting reusable project components. Further, the reusability detecting module 239 may select one of the one or more pre-existing requirements from the one or more pre-existing requirements that are determined to bear a similarity score which is higher than the predefined similarity score. In some embodiments, the reusability detecting module 239 may select the one of the one or more pre-existing requirements based on the reuse history 215, which is explained in detail at a later section. Upon selecting one of the one or more pre-existing requirement based on the similarity score as mentioned above, the processor 109 may retrieve the project components that are associated with the selected pre-existing requirement from the database 115. The project components thus retrieved may be reusable project components that may be used for building the new project. In some embodiments, the reusable project components may be stored as reusable data 217.

In some scenarios, the one or more pre-existing requirements may bear an identical similarity score. In some embodiments, similarity score of the one or more pre-existing requirements bearing the identical similarity score may be higher than the predefined similarity score. In these scenarios, the reusability detecting module 239 prioritize the one or more pre-existing requirements based on corresponding reuse history 215. In some embodiments, the reuse history 215 may include, but not limited to, a predefined weightage associated with the pre-existing requirement and a reasoning of selection of the pre-existing requirement for building pre-existing projects. The predefined weightage may indicate number of times the corresponding pre-existing requirement was selected for reuse. Reasoning of the selection may indicate why the user selected the pre-existing requirement for reuse.

As an example, consider an exemplary reuse history 215 for an exemplary pre-existing requirement as shown below:
Project name—project 2
Request ID—SRS_Fls_12132a
Description—Flash driver shall be configurable statically
Reason for selection—The requirement was reused because flash driver configuration is required to be static.
Weightage—+3

Further, consider the abovementioned exemplary pre-existing requirement is selected by the user. The user may provide a reason for selection of the pre-existing requirement. Immediately the reusability detecting module 239 may update the reuse history 215 i.e. the reason for selection would be updated and the weightage associated with the pre-existing requirement may be incremented by a predefined value such as 1. Therefore, the new weightage for the pre-existing requirement in the above mentioned exemplary scenario, may be updated to "+4" from "+3"

Therefore, the reusability detecting system may prioritize the pre-existing requirements bearing the identical similarity score based on the reuse history 215. In some embodiments, more the weightage of the pre-existing requirement, more would be the priority provided to the pre-existing requirement. The reusability detecting module 239 may provide a recommendation to the user to select the pre-existing requirement with highest priority. However, the final decision related to the selection may be left to user decision. Upon selecting the pre-existing requirement, the user should provide a reason for his selection, which would be further updated in the reuse history 215. In some embodiments, the reusability detecting module 239 may update the reuse history 215 based on the user selection and reasoning for the selection. Upon selecting the pre-existing requirement based on the similarity score, the processor 109 may retrieve project components associated with the selected pre-existing requirement from the database 115. The project components thus retrieved may be the reusable project components for building the new project.

In a further embodiment, the processor 109 may detect one or more other pre-existing requirements that have similar basic design as the one or more pre-existing requirements detected to be similar to the current requirement. Further, the processor 109 may display the one or more other pre-existing requirements along with the one or more pre-existing requirements for user selection.

As an example, consider Original Requirement (OR) 1 and OR 2 have a Base Design (BD) 1. Consider the processor 109 receives a New Requirement (NR) 1. Based on the similarity score, consider that NR 1 is closely related to OR 1. However, OR 1 and OR 2 have same base design. Therefore, both OR 1 and OR 2 are recommended for NR 1, since OR 2 has a same base design as OR 1. This relationship may be termed as co-occurrence.

Figure 3:
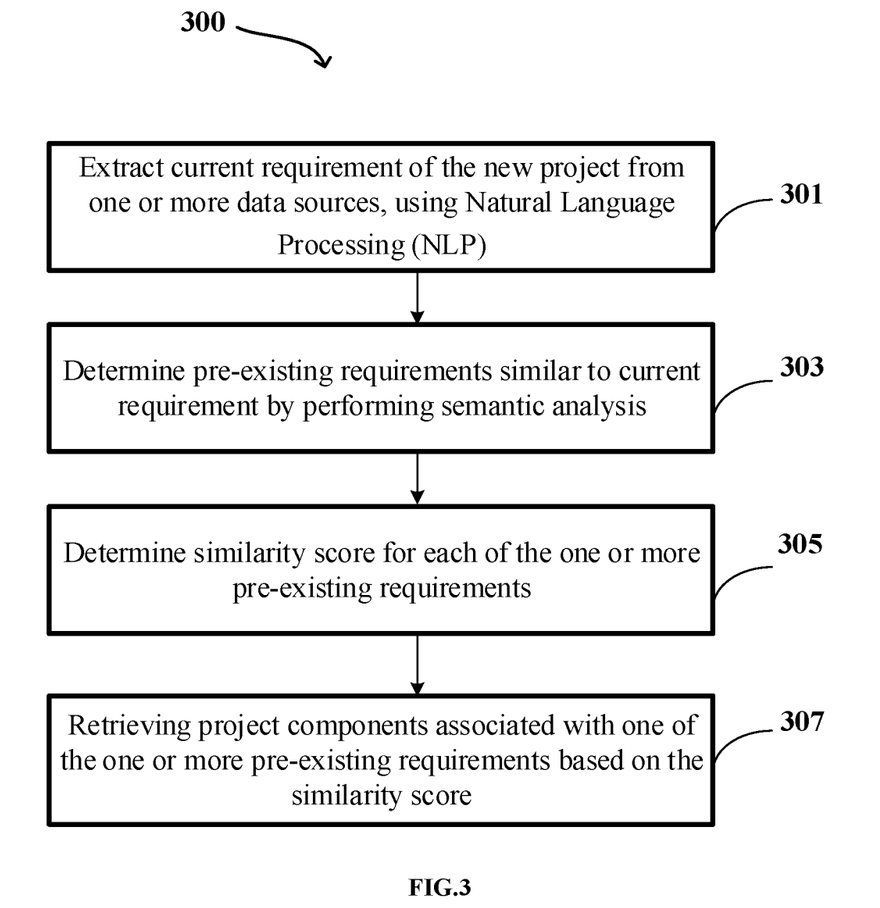
FIG. 3 shows a flowchart illustrating a method of identifying reusable project components for building a new project in accordance with some embodiments of the present disclosure.

FIG. 3 illustrates a flowchart showing a method of identifying reusable project components for building a new project in accordance with some embodiments of the present disclosure.

As illustrated in FIG. 3, the method 300 includes one or more blocks illustrating a method of identifying reusable project components for building a new project. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include extracting, by a processor 109 of the reusability detecting system 107, current requirement of the new project from one or more data sources 103, using Natural Language Processing (NLP). In some embodiments, the processor 109 may extract the current requirement of the new project using (NLP) from the entire information related to the current requirement.

At block 303, the method 300 may include detecting, by the processor 109, one or more pre-existing requirements associated with pre-existing projects, similar to the current requirement by performing semantic analysis of the current requirement and the one or more pre-existing requirements. In some embodiments, the semantic analysis may be performed using a predefined machine learning technique. As an example, the predefined machine learning technique may be a Latent Semantic Analysis (LSA) technique.

At block 305, the method 300 may include determining, by the processor 109, a similarity score for each of the one or more pre-existing requirements based on degree of similarity between the current requirement and the one or more pre-existing requirements.

At block 307, the method 300 may include retrieving, by the processor 109, project components associated with one of the one or more pre-existing requirements based on the similarity score. In some embodiments, the processor 109 may determine a highest similarity score among the similarity scores of each of the one or more pre-existing requirements. The one of the one or more pre-existing requirements bearing the determined highest similarity score may be considered as a closest match to the current requirement of the new project. In some other embodiments, the processor 109 may determine the similarity scores that exceed a predefined similarity score. Further, the processor 109 may select one of the one or more pre-existing requirements from the one or more pre-existing requirements that are determined to bear the similarity score which is higher than the predefined similarity score. The processor 109 may select one of the one or more pre-existing requirements based on reuse history 215. The concept of the reuse history 215 is explained in detail under one section of FIG. 2A. Upon selecting one of the one or more pre-existing requirements based on the similarity score, the processor 109 may retrieve the project components that are associated with the selected pre-existing requirement from the database 115. The retrieved project components are the reusable project components for building the new project.

In some embodiments, the project components may be retrieved using a traceability map which can be leveraged by concepts such as, but not limited to, Unified Modelling Language (UML).

Upon selecting one of the one or more pre-existing requirements based on the similarity score, UML shall help in establishing traceability and map the requirements to the individual components related to the selected pre-existing requirement and how they can interact with other software components using activity diagram, class diagram and composite structure diagrams etc.

Figure 4:
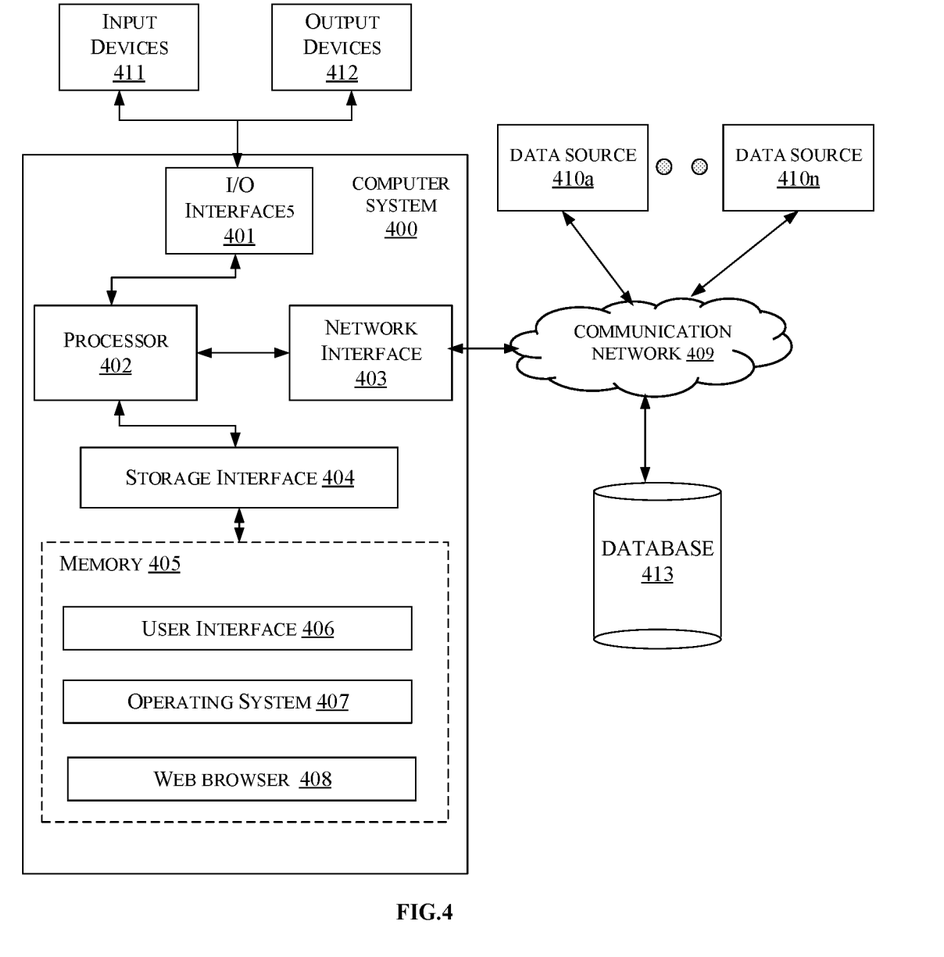
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, FIG. 4 illustrates a block diagram of an exemplary computer system 400 for implementing embodiments consistent with the present invention. In an embodiment, the computer system 400 can be reusability detecting system 107 that is used for identifying reusable project components for building a new project. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with data source 1 $410_a$ to data source n $410_n$ (also referred to as one or more data sources 410) and a database 413. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more data sources 410 may include a customer and a Subject Matter Expert (SME). In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method and a system for identifying reusable project components for building a new project. Reusing ability reduces enormous time, cost and resources that would be involved in rebuilding a new project module from the beginning.

The present disclosure is NLP-based, that eliminates the process of manually converting the customer requirements into machine understandable profiles using a predefined template and taxonomy. Therefore, the present disclosure eliminates substantial number of procedures involved in detecting reusability, thereby reducing the complexity and creating an automated and user-friendly environment.

The present disclosure helps in increasing productivity by subsiding inefficient methods of developing project modules that require manual intervention.

A description of an embodiment with several components in communication with each other does not imply that all such components are required. On the contrary a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The Specification has described a method and a system for identifying reusable project components for building a new project. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising,"

"having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A method for identifying reusable project components for building a new project, the method comprising:
   extracting, by a reusability detecting system, current requirement of the new project from one or more data sources, using Natural Language Processing;
   detecting, by the reusability detecting system, one or more pre-existing requirements associated with pre-existing projects, similar to the current requirement by performing semantic analysis of the current requirement and the one or more pre-existing requirements;
   determining, by the reusability detecting system, a similarity score for each of the one or more pre-existing requirements based on degree of similarity between the current requirement and the one or more pre-existing requirements; and
   retrieving, by the reusability detecting system, project components associated with one of the one or more pre-existing requirements based on the similarity score, wherein the retrieved project components are the reusable project components for building the new project.

2. The method as claimed in claim 1, wherein the one of the one or more pre-existing requirements belongs to one or more pre-existing requirements bearing similarity scores higher than a predefined similarity score.

3. The method as claimed in claim 1, wherein each of the one or more pre-existing requirements is associated with a corresponding reuse history.

4. The method as claimed in claim 3, wherein the reuse history comprises a predefined weightage indicating number of times the pre-existing requirement is reused and a reasoning of selection of the pre-existing requirement for building pre-existing projects.

5. The method as claimed in claim 1 further comprises prioritizing, by the reusability detecting system, the one or more pre-existing requirements based on corresponding reuse history, when at least two of the one or more pre-existing requirements bear an identical similarity score.

6. The method as claimed in claim 5 further comprises:
   receiving, by the reusability detecting system, a user selection of one of the one or more pre-existing requirements that are prioritized and a reasoning for selection of one of the one or more pre-existing requirements; and
   retrieving, by the reusability detecting system, project modules associated with the selected pre-existing requirement for reuse.

7. The method as claimed in claim 6 further comprises updating, by the reusability detecting system, the corresponding reuse history based on the user selection and the reasoning for the selection.

8. The method as claimed in claim 1 further comprises:
   detecting, by the reusability detecting system, one or more other pre-existing requirements having similar basic design as the one or more pre-existing requirements detected to be similar to the current requirement; and
   displaying, by the reusability detecting system, the one or more other pre-existing requirements along with the one or more pre-existing requirements for user selection.

9. The method as claimed in claim 1 further comprises self-learning, by the reusability detecting system, synonyms related to one or more words of the current requirement and the one or more pre-existing requirements based on the semantic analysis.

10. The method as claimed in claim 1, wherein the semantic analysis is performed using a predefined machine learning technique.

11. A reusability detecting system for identifying reusable project components for building a new project, the reusability detecting system comprising:
    a processor; and
    a memory communicatively coupled to the processor, wherein the memory stores processor-executable instructions, which, on execution, causes the processor to:
    extract current requirement of the new project from one or more data sources, using Natural Language Processing (NLP);
    detect one or more pre-existing requirements associated with pre-existing projects, similar to the current requirement by performing semantic analysis of the current requirement and the one or more pre-existing requirements;
    determine a similarity score for each of the one or more pre-existing requirements based on degree of similarity between the current requirement and the one or more pre-existing requirements; and
    retrieve project components associated with one of the one or more pre-existing requirements based on the similarity score, wherein the retrieved project components are the reusable project components for building the new project.

12. The reusability detecting system as claimed in claim 11, wherein the one of the one or more pre-existing requirements belongs to one or more pre-existing requirements bearing similarity scores higher than a predefined similarity score.

13. The reusability detecting system as claimed in claim 11, wherein each of the one or more pre-existing requirements is associated with a corresponding reuse history.

14. The reusability detecting system as claimed in claim 13, wherein the reuse history comprises a predefined weightage indicating number of times the pre-existing requirement is reused and a reasoning of selection of the pre-existing requirement for building pre-existing projects.

15. The reusability detecting system as claimed in claim 11, wherein the processor is further configured to prioritize the one or more pre-existing requirements based on corresponding reuse history, when at least two of the one or more pre-existing requirements bear an identical similarity score.

16. The reusability detecting system as claimed in claim 15, wherein the processor is further configured to:
receive a user selection of one of the one or more pre-existing requirements that are prioritized and a reasoning for selection of one of the one or more pre-existing requirements; and
retrieve project modules associated with the selected pre-existing requirement for reuse.

17. The reusability detecting system as claimed in claim 16 wherein the processor is further configured to update the corresponding reuse history based on the user selection and the reasoning for the selection.

18. The reusability detecting system as claimed in claim 11, wherein the processor is further configured to:
detect one or more other pre-existing requirements having similar basic design as the one or more pre-existing requirements detected to be similar to the current requirement; and
display the one or more other pre-existing requirements along with the one or more pre-existing requirements for user selection.

19. The reusability detecting system as claimed in claim 11, wherein the processor is further configured to self-learn synonyms related to one or more words of the current requirement and the one or more pre-existing requirements based on the semantic analysis.

20. The reusability detecting system as claimed in claim 11, wherein the processor performs semantic analysis using a predefined machine learning technique.

* * * * *